US007827329B2

(12) United States Patent
Hartmann et al.

(10) Patent No.: US 7,827,329 B2
(45) Date of Patent: *Nov. 2, 2010

(54) CHARACTER INTERACTIVE INPUT/OUTPUT

(75) Inventors: Richard G. Hartmann, Endicott, NY (US); Daniel L. Krissell, Hallstead, PA (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/222,328

(22) Filed: Aug. 7, 2008

(65) Prior Publication Data

US 2008/0307129 A1    Dec. 11, 2008

Related U.S. Application Data

(63) Continuation of application No. 11/493,886, filed on Jul. 26, 2006, now Pat. No. 7,441,057, which is a continuation of application No. 09/965,075, filed on Sep. 27, 2001, now Pat. No. 7,124,218.

(51) Int. Cl.
*G06F 13/12* (2006.01)
*G06F 13/38* (2006.01)
(52) U.S. Cl. .................. 710/67; 709/203; 709/229; 710/29; 710/64
(58) Field of Classification Search ................. None
See application file for complete search history.

(56) References Cited

U.S. PATENT DOCUMENTS

| 4,377,852 A | 3/1983 | Thompson .................. 710/47 |
| 4,559,614 A | 12/1985 | Peek et al. ................. 718/100 |
| 4,574,362 A | 3/1986 | Spindel et al. ............... 710/65 |
| 4,631,666 A | 12/1986 | Harris et al. ................ 709/217 |
| 4,852,127 A | 7/1989 | Fraser et al. ................. 375/94 |
| 4,972,368 A | 11/1990 | O'Brien et al. .............. 710/67 |
| 5,159,684 A | 10/1992 | Kroll et al. ................. 710/104 |
| 5,361,199 A | 11/1994 | Shoquist et al. .............. 705/26 |
| 5,361,344 A | 11/1994 | Beardsley et al. ........... 395/500 |
| 5,734,871 A | 3/1998 | Kleineman et al. .......... 719/320 |
| 5,748,888 A | 5/1998 | Angelo et al. .............. 713/200 |
| 5,757,925 A | 5/1998 | Faybishenko .............. 709/203 |
| 5,764,916 A | 6/1998 | Busey et al. ................ 709/227 |
| 5,841,992 A | 11/1998 | Martin ...................... 709/250 |

(Continued)

OTHER PUBLICATIONS

Saffady, William, Ed. "AMPEX Display Terminals" Computer EquipmentReview, vol. 5, No. 1, Jan.-Jun. 1983. ISSN 0278-260X. Meckler Publishing, Westport, Connecticut. 1983.

*Primary Examiner*—Dustin Nguyen
(74) *Attorney, Agent, or Firm*—Shelley M. Beckstrand; Robert R. Williams

(57) ABSTRACT

A system and method for supporting character interactive input/output operation in a half-duplex block-mode environment including a workstation and a server. Keystrokes at the workstation received into an auto enter, non-display entity on the workstation display are automatically transferred as entered from the workstation to a server application which processes the keystroke and responds in a manner appropriate to the context of the application.

5 Claims, 6 Drawing Sheets

U.S. PATENT DOCUMENTS

| | | | |
|---|---|---|---|
| 6,076,081 A | 6/2000 | Bass et al. | 705/401 |
| 6,081,856 A | 6/2000 | Comer | 710/67 |
| 6,233,543 B1 | 5/2001 | Butts et al. | 703/27 |
| 6,412,009 B1 | 6/2002 | Erickson et al. | 709/228 |
| 6,442,607 B1 | 8/2002 | Korn et al. | 709/225 |

FULL DUPLEX CHARACTER MODE (VTxxx)

HALF DUPLEX BLOCK MODE

CHARACTER INTERACTIVE INPUT/OUTPUT

This application is a continuation of U.S. patent application Ser. No. 11/493,886, now U.S. Pat. No. 7,441,057, issued Oct. 21, 2008, filed 26 Jul. 2006, for "System and method for providing character interactive input/output", which is a Continuation of U.S. patent application Ser. No. 09/965,075, filed Sep. 27, 2001, now U.S. Pat. No. 7,124,218, issued 17 Oct. 2006 for "System and Method for Providing Character Interactive Input/Output".

BACKGROUND OF THE INVENTION

1. Technical Field of the Invention

This invention pertains to inter operability among various computer platform architectures existing in a network. More particularly, it pertains to providing the look and feel of character interactive I/O operation across disparate architectures.

2. Background Art

In a client/server computer network, inter operability among the various platform architectures that exist in the network is a primary goal of the network. In particular, client/server network applications such as Telnet, SMTP, FTP, LPD, etc. are expected to be able to work equivalently, independent of the platform architecture on which they are implemented. However, due to differing architectures of the various platforms, there are often obstacles that severely limit developing and providing a common "look and feel" in terms of network application user interfaces presented on each platform. One such architecture example is the half-duplex block-mode display devices supported by the IBM 5250 architecture iSeries (AS/400) and 3270 (S/390) platforms. Another architecture example is the character interactive I/O architecture, such as supported by Unix (including AIX, Linux, etc.)

There is a need in the art for a system and method for providing the same "look and feel" of network applications on each platform, even though they must be supported differently by the architectures. The physical rendering of the client user interface can often limit the logical requirement of the server application in the network.

For example, when using Telnet from a Unix platform to communicate with an iSeries platform, it is expected that using Telnet from the iSeries platform to the Unix platform (the reverse direction) will work in an equivalent manner and have similar "look and feel" at the user interface. Failure to work in such a bi-directional manner is an inter operability problem. Failure to inter operate creates significant user dissatisfaction due either to loss of functionality or the need to learn custom circumventions or workarounds. Worse, lack of inter operability leads to inability to market or sell a product as a solution in a client/server computer network.

One such networking inter operability problem exists between the iSeries and the Unix platforms. The iSeries is a half-duplex block-mode display device architecture, which is characteristic of all 5250 and 3270 based display devices and any clone implementation. The Unix box is a character interactive echo-plexed architecture. Unix based display sessions are based on VTxxx type terminals and define a standard character interactive I/O keyboard as the default that must be supported by any display clients wishing to run traditional text display based Unix applications. In the Telnet protocol, a client host rendering a display should emulate the VTxxx (i.e. VT100, VT220) based display and keyboard characteristics to the best of its ability. Due to the IBM 5250/3270 display device architecture of half-duplex block-mode buffering, characters are collected in a buffer until an action identifier (AID) key is entered (such as Enter, program function PF1-PF24 keystrokes, etc.) and all the keystrokes in the buffer transferred to the iSeries application, rather than processed one at a time by an application. This conflicts with the need for a VTxxx type terminal to do character interactive I/O, which essentially means it needs to process each character, as it is typed. This means each character keystroke typed in a half duplex block mode (iSeries Telnet) client session that is running a character interactive I/O application on a Unix server does not necessarily get processed within the context of the server application as a VTxxx keystroke. Instead, it is buffered in the iSeries display device until an action keystroke is pressed. The action keystroke required is normally an enter or program function (PF) key. This is a character interactive I/O inter operability problem on the Telnet client side.

An example of a character interactive I/O inter operability problem involves password fields. In a native character interactive ASCII environment when the client connects to a Unix Telnet server, the user is presented with a login (or sign-on) panel in which to enter the profile or userid name and password. Typically, each character of the profile or userid name is echoed to the screen as it is typed in, and the cursor position moves with each character typed in. However, each character of the password is hidden by the application itself, which echos a replacement character or characters, such as an asterisk "*", blanks, XXX, etc. . . . , or by not echoing a character at all and leaving the cursor position unchanged. Unfortunately, again due to half-duplex block-mode architecture design, character substitution does not automatically occur for an iSeries Telnet client. The current iSeries Telnet client circumvention requires the user to press the program function key assigned to the special function "hide keystroke echoes until the next action key", which is set to PF6 by default for iSeries Telnet client. This local "hotkey function" signals the iSeries Telnet client program that the characters that follow are to be hidden. The iSeries Telnet client refreshes the screen input fields with non display attributes therein instructing the display device to simply send in the keystrokes with the next action key (AID) to avoid displaying the keystrokes to the screen. This also has the side effect of defeating the ability of the application to substitute any preferred different CechoC characters, such as echoing a "XXX", or "**" or "??" string for each character typed (something Lotus Notes does). Again, this solution is rather "ugly" from a customer perspective, requires knowledge of the circumvention and is not intuitive.

Another example of a character interactive I/O inter operability problem relates to the use of graphical characters in different contexts. Consider a Lotus 1-2-3 spreadsheet application to work with saved 1-2-3 files. Lotus 1-2-3 has a classic menu hotkey, where the spreadsheet application recognizes the "/" as a special version of the introducer character. In the context of the Lotus 1-2-3 application, the "/" character is to be used as a command to pop up an application selection menu, not as a direct character to be echoed to the display or typed into the spreadsheet itself. In order to send the "/" alone as a "real" ASCII client would, the iSeries has to use the PF11 ("send without carriage return") trick to cause a client Telnet to avoid sending the Enter keystroke equivalent for ASCII carriage return (0x0D).

These examples are deviations from VTxxx defacto standards required by users of 5250/3270 architectures, and it forces users to memorize custom workarounds that are generally not well-known to the average character interactive I/O network user. These workarounds and circumventions are not well received by customers when 5250/3270 platforms are marketed as a solution in any network with character interactive I/O operating systems, and ironically do not inter operate with AIX (a RISC platform).

Referring to FIG. 1, full duplex operation is illustrated. VTxxx is full-duplex character interactive mode support. This means that as each character is typed on the client workstation, it is sent to the Unix server for processing. The Unix server application then decides based on the content of the dialogue whether to echo the character to the client workstation so that it appears on the display terminal. Thus, in native VTxxx based display, each character typed makes a full round-trip path from the client workstation to the Unix server and back to the client workstation for display. As is represented by lines 24 and 25, keystrokes entered at keyboard 20 are sent directly by client workstation 22 to character interactive application 23. As is represented by lines 26 and 27, character interactive I/O application output is returned directly to display 21. The round trip 24, 25, 26 and 27 may occur (again the application may choose to not echo or advance the cursor) for each keystroke, that is for every character input at keyboard 20.

Referring to FIG. 2, half duplex operation is illustrated, such as would be implemented in an iSeries (5250) configuration. In this configuration, keystrokes 24 entered at keyboard 20 are accumulated in buffer 30. If local echoing is on (normally, echoing is on by default), as is represented by element 35, these keystrokes 24 will be echoed locally to display 21 (as it is typed on the keyboard 20). As is represented by element 33, when an enter action key is detected in buffer 30 from keystrokes 24, buffered data is sent to application 32 for processing. Application output 34, 36 is sent to client display 21. The round trip represented by elements 24, 30, 33, 34 and 36 occurs when an action key is depressed at keyboard 20 and detected by client workstation 31.

The above discussion of half duplex (see FIG. 2) is oversimplified in that there is no visible TCP/IP network in the figure. While such a configuration may exist in hardwired networks that use dumb terminals connected via Twinax cabling, the trend in current technology is toward a TCP/IP, or the like, network. (The present invention applies to any client including SNA or Twinax and is not limited to TCP.)

Referring to FIG. 3, in a TCP/IP network, dumb terminals are replaced with terminal emulators that run on PC workstations and are essentially Telnet clients. This emulator configuration operates in cascaded half duplex mode, a half duplex block-mode imitation of character interactive I/O. Most iSeries customers connect to the iSeries in a TCP/IP network using a Telnet client 40 bundled as part of a package. Client Access Express is an example of such a package. In such a configuration, connectivity for the iSeries from the client workstation 31 using half duplex block mode is achieved without any keystroke problems for applications written with half-duplex block mode architecture and running on the iSeries 43. The problem with half duplex block mode arises when that same client 31, which is already connected to the iSeries 43, then tries to connect to a Unix platform 48 using the iSeries Telnet client 45 and run applications 49 on the Unix platform. That is, workstation 31 uses a terminal emulator (e.g., Client Access Express) to connect to iSeries 45 via Telnet server 43 and gets a command line 44. At command line 44, Telnet client 45 is used to cascade to Unix Telnet server 48 and run application 49. Application 49 needs VTxxx mode (full duplex character mode represented by lines 46, 47) to work properly with keyboard 20 and display 21, but block-mode operation of workstation 31 interferes.

Illustrated in FIG. 2 is the operation of a 5250/3270 configuration, which requires that all data be in EBCDIC format. Illustrated in FIG. 3 is a Unix platform, which requires that the EBCDIC be converted at element 39 to ASCII by the iSeries Telnet client before it is put on the communication link to the Unix box 48. Thus, ASCII data goes out on line 46 and returns on line 47 to client 45. Not only is data translated in converter 39, but action keys in EBCDIC such as the enter (0xF1) key are converted into equivalent ASCII control codes.

There is a need in the art for a system and method which solves the character interactive I/O inter operability problem on the iSeries Telnet client.

It is, therefore, an object of the invention to provide an improved system and method for rendering a common "look and feel" on different platforms and architectures.

It is a further object of the invention to provide a system and method for character interactive I/O in a half duplex block mode environment.

SUMMARY OF THE INVENTION

A system and method for supporting character interactive input/output operation in a half-duplex block-mode environment including a workstation and a server. Keystrokes at the workstation received into an auto enter, non-display entity on the workstation display are automatically transferred as entered from the workstation to a server application which processes the keystroke and responds in a manner appropriate to the context of the application.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, an auto enter non-display character position on a local display is used to receive text based keystrokes from the keyboard.

In an exemplary embodiment, in a half-duplex block-mode device, such as a 5250 display device, buffering of typed characters, in the sense of block-mode buffering done by the 5250/3270 architecture, is avoided and each character as typed is translated from EBCDIC to ASCII and then forwarded in a manner like that of a native character interactive I/O network client.

Several acronyms are used herein, including the following:
FTP file transfer protocol
IPX Internet packet exchange
LPD line printer daemon (a daemon is a server, which is a listening job or process.)
LUD logical unit descriptor
RISC reduced instruction set computing
SMTP simple mail transport protocol
SNA system network architecture
VT100 character interactive mode VT100 is a Digital Equipment Corporation (DEC) model that has become the de facto standard for text based display mode.

Figure 1:
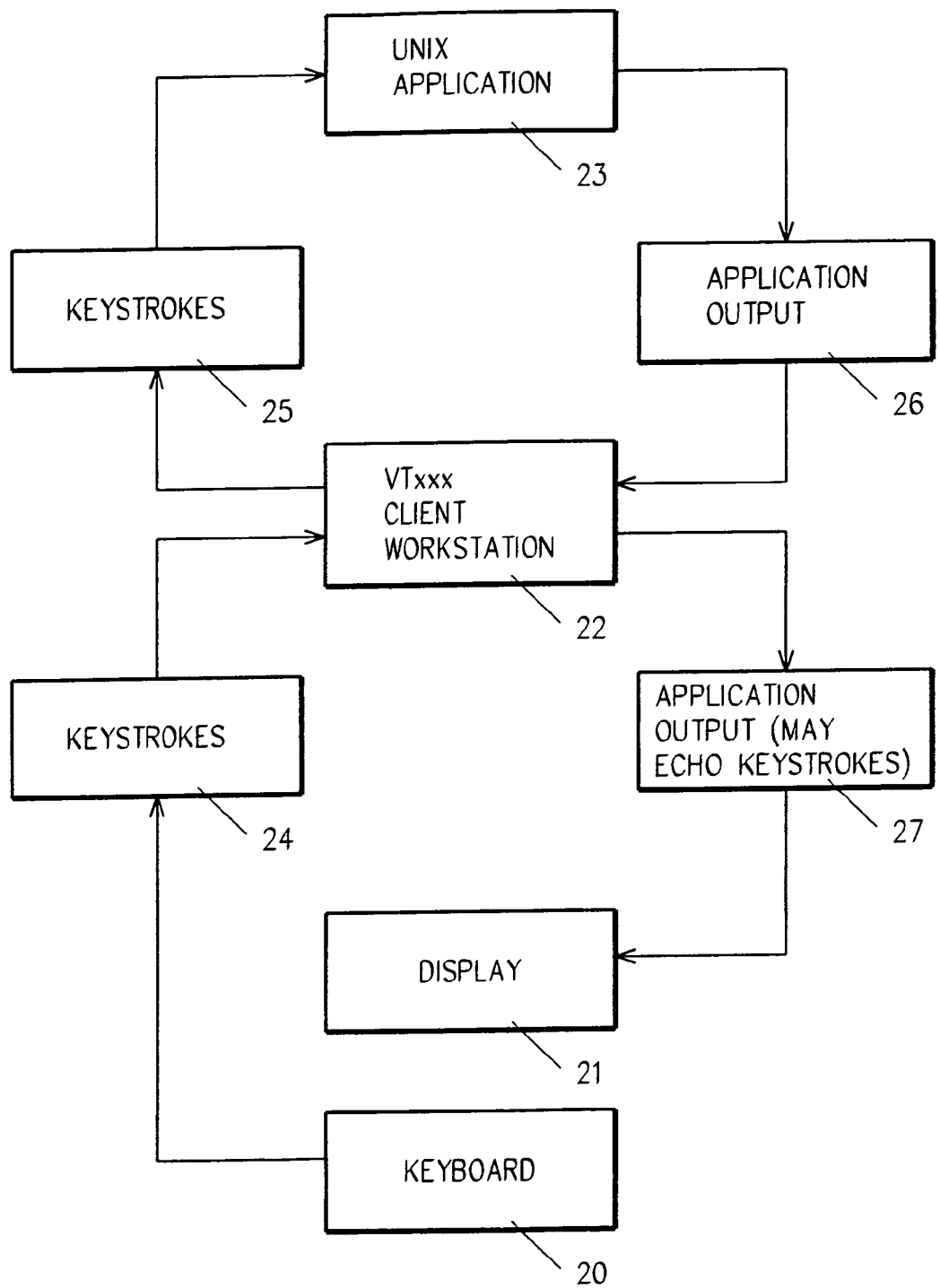
FIG. 1 illustrates full duplex character mode in accordance with the prior art VTxxx architecture.
Figure 2:
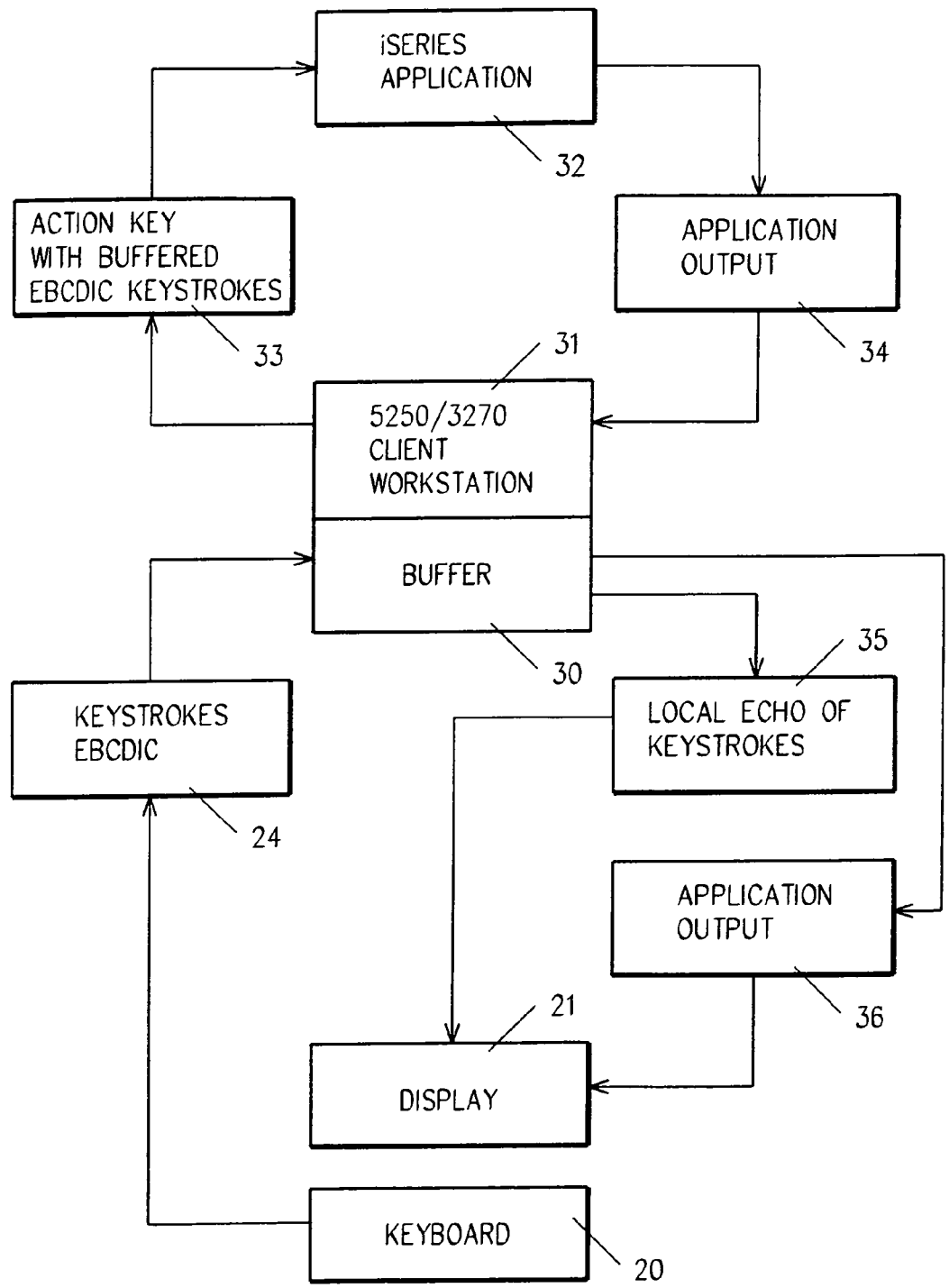
FIG. 2 illustrates half duplex block mode in accordance with the prior art 5250/3270 architecture.
Figure 3:
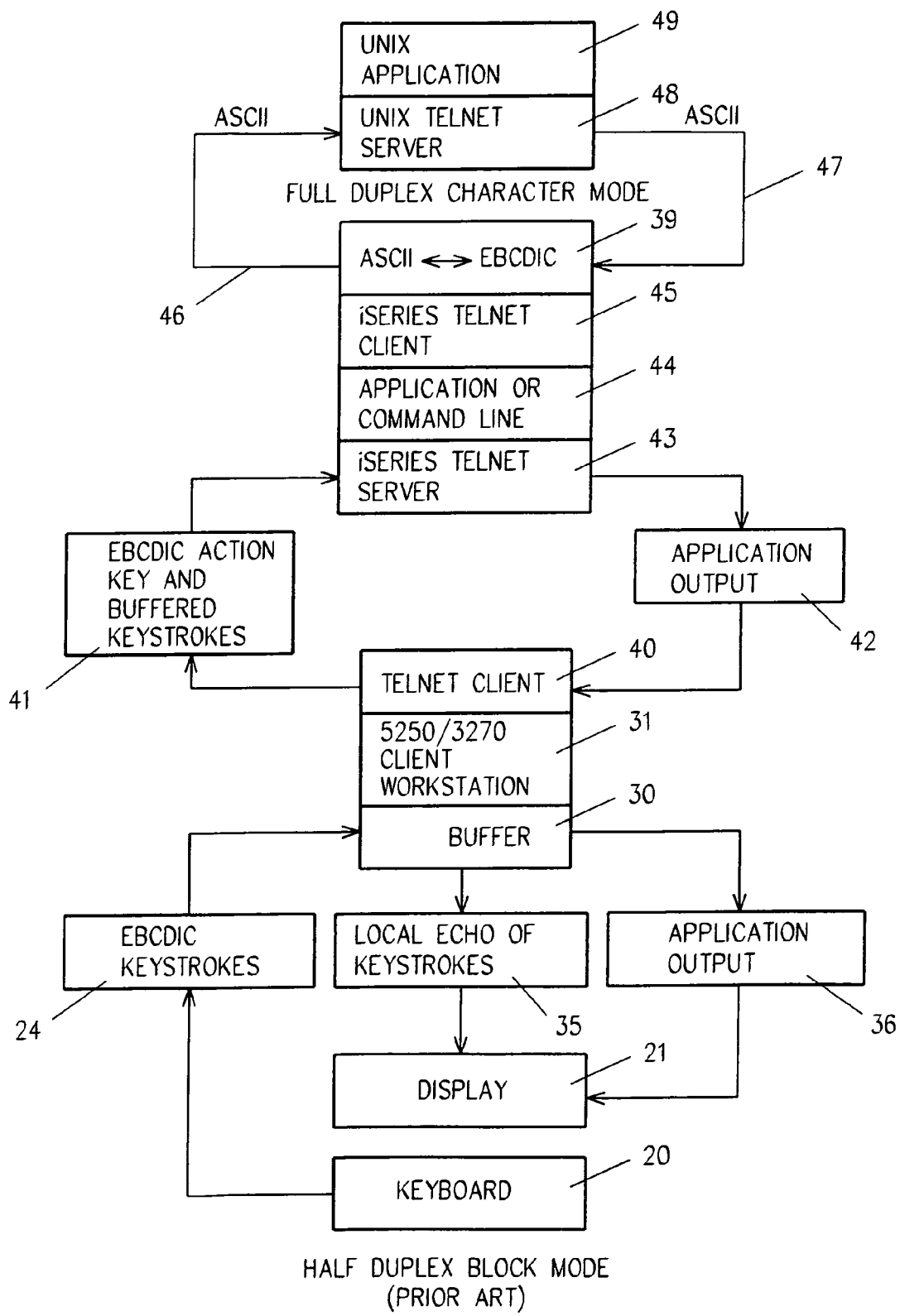
FIG. 3 illustrates half duplex block mode in combination with full duplex character mode, and illustrates the problem configuration of the prior art addressed by the present invention.
Figure 4:
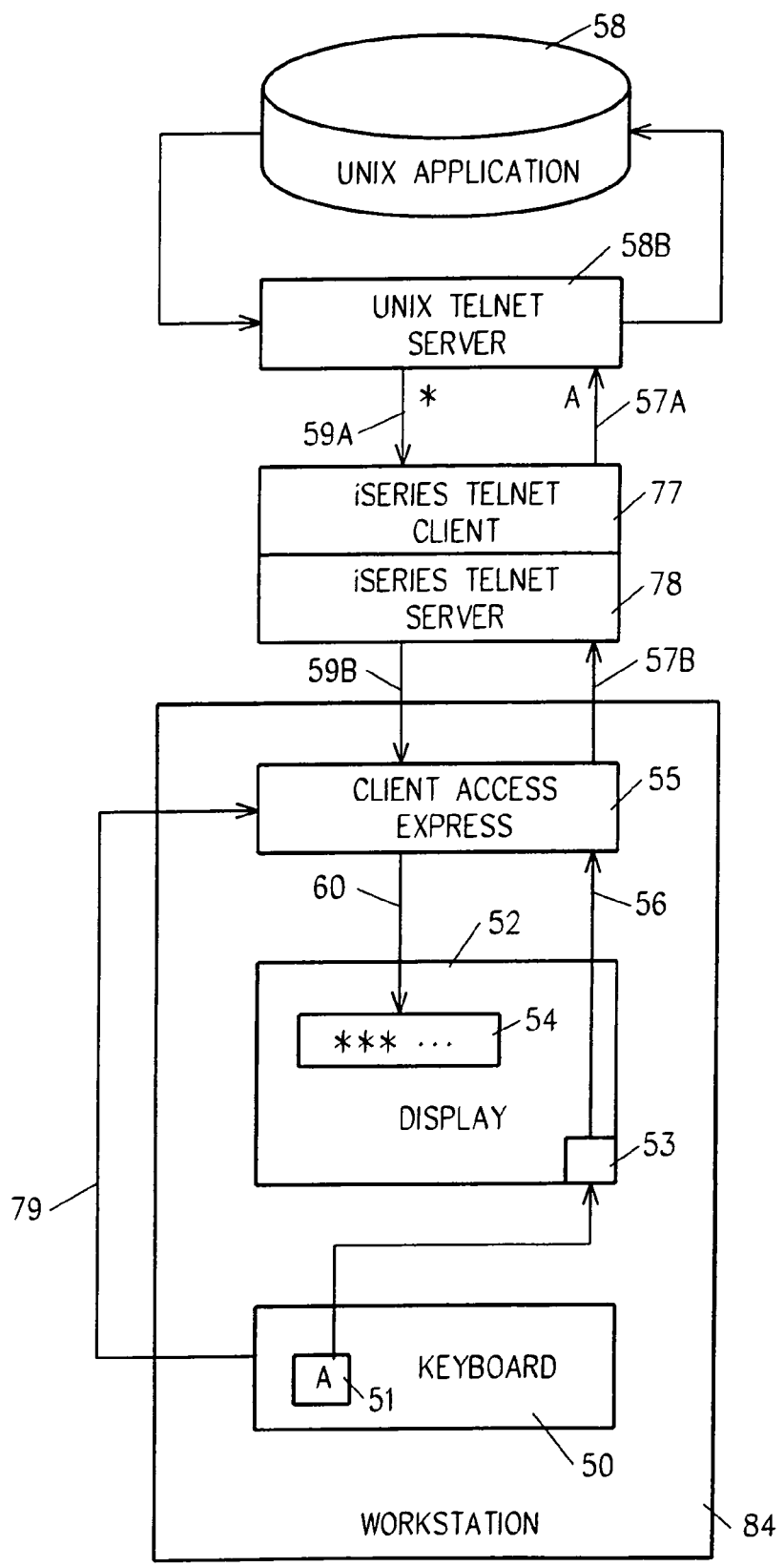
FIG. 4 illustrates a preferred embodiment of the invention, including an auto enter non-display character position on a local display for receiving all keyboard entered data.

Referring to FIG. 4, 5250 display device 52 is configured or defined (with respect to keyboard 50) as comprising a 1-byte character input field 53 that has auto-enter and non-displayable attributes, as distinguished from the normal 1920-byte character input field that is possible on a 24×80 display device. The auto-enter attribute acts like an internal windows based visibility (scan codes, etc. . . . ) and affords the emulator the ability to send an action key (AID) in this context, since it causes an attention signal 79 to the workstation running Client Access Express 55 to occur. This attention signal 79 is then passed to the iSeries Telnet Client 77 via the iSeries Telnet Server 78 as represented by line 57B. The non-displayable attribute prevents any local echo from showing an input character on the display.

As characters 51 are typed at workstation keyboard 50, an attention identifier (AID) 79 is signaled from the workstation (running Client Access Express) 55, to the iSeries Telnet client 77 via the iSeries Telnet server 78 as represented by line 57B, and a 1-byte character input field content is retrieved from a keystroke buffer 53 and sent, as is represented by line 56, workstation (running Client Access Express) 55 and passed on to iSeries Telnet client 77 via the iSeries Telnet server 78 as represented by line 57b. ISeries Telnet client 77 then translates the character from EBCDIC to ASCII and safely transmits the keystroke, as is represented by line 57A, to remote Unix application 58 via Unix Telnet Server 58B, where the keystroke is interpreted within the context of the Unix application 58. As is represented by line 59A, the output (if any) of Unix application is then returned to the iSeries Telnet client 77 and passed on to workstation (running Client Access Express) 55 via the iSeries Telnet server 78 and, as represented by line 60, to workstation display 52 (which is "business as usual").

Thus, by configuring display device 52 to a 1-byte field 53, processing occurs immediately for each character 51 typed at keyboard 50, as opposed to buffering many keystrokes while waiting for action or AID key.

In accordance with this embodiment of the invention, a user typing a password, for example, for a character interactive I/O application 58 would see, in password display field 54 of display 52, the effect of application 58 hiding each keystroke of the password and, as shown in FIG. 4, echoing back another character, in this example the "*" character, instead of seeing the password echoed to field 54 of display 52 as would typically occur for 5250 block-mode devices. This removes the need to use circumventions, such as the PF6 "hide keystroke echoes until the next action key" work around previously described.

This significantly enhances the iSeries's heterogeneous connectivity to more seamlessly connect with character interactive I/O dependent operating systems such as Unix.

Figure 5:
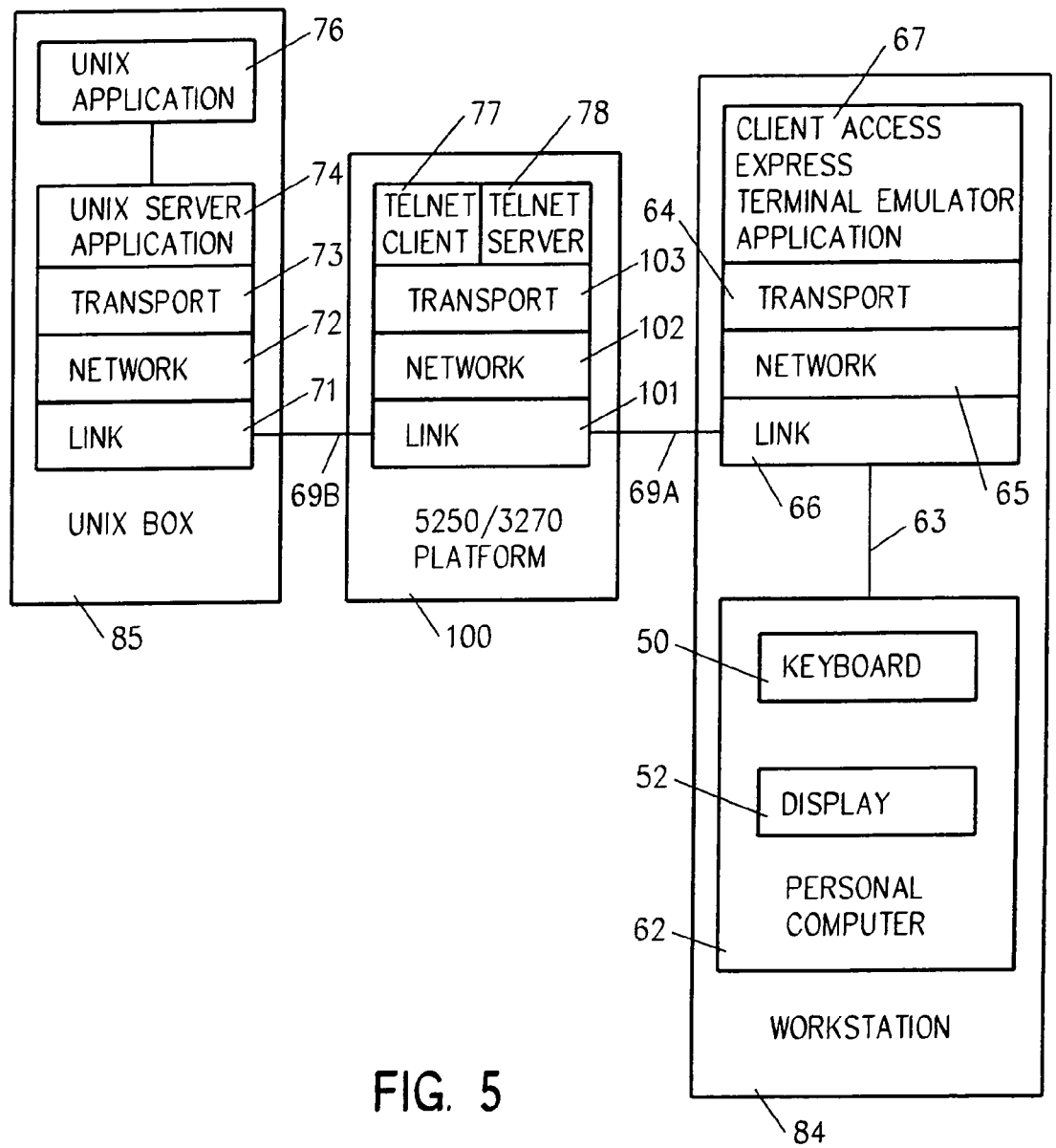
FIG. 5 illustrates a preferred embodiment of the invention, including a network connection between the workstation and Telnet client.

Referring to FIG. 5, the embodiment of the invention shown in FIG. 4 is further described, illustrating a typical network environment.

A user terminal 62 including keyboard 50 and display 52, is connected through network 69A to iSeries Telnet server 78 and iSeries Telnet client 77 and ultimately via network 69B to server application 74 and host application 76. This is done via protocol stacks for workstation 84, 5250/3270 platform 100, and Unix box 84. These protocol stacks include a plurality of layers 64-67, 101-103, and 71-74, respectively, in, for example, a TCP/IP protocol suite (as further described in connection with FIG. 6). In this example, terminal emulator 67 is a Telnet client, such as Client Access Express.

Figure 6:
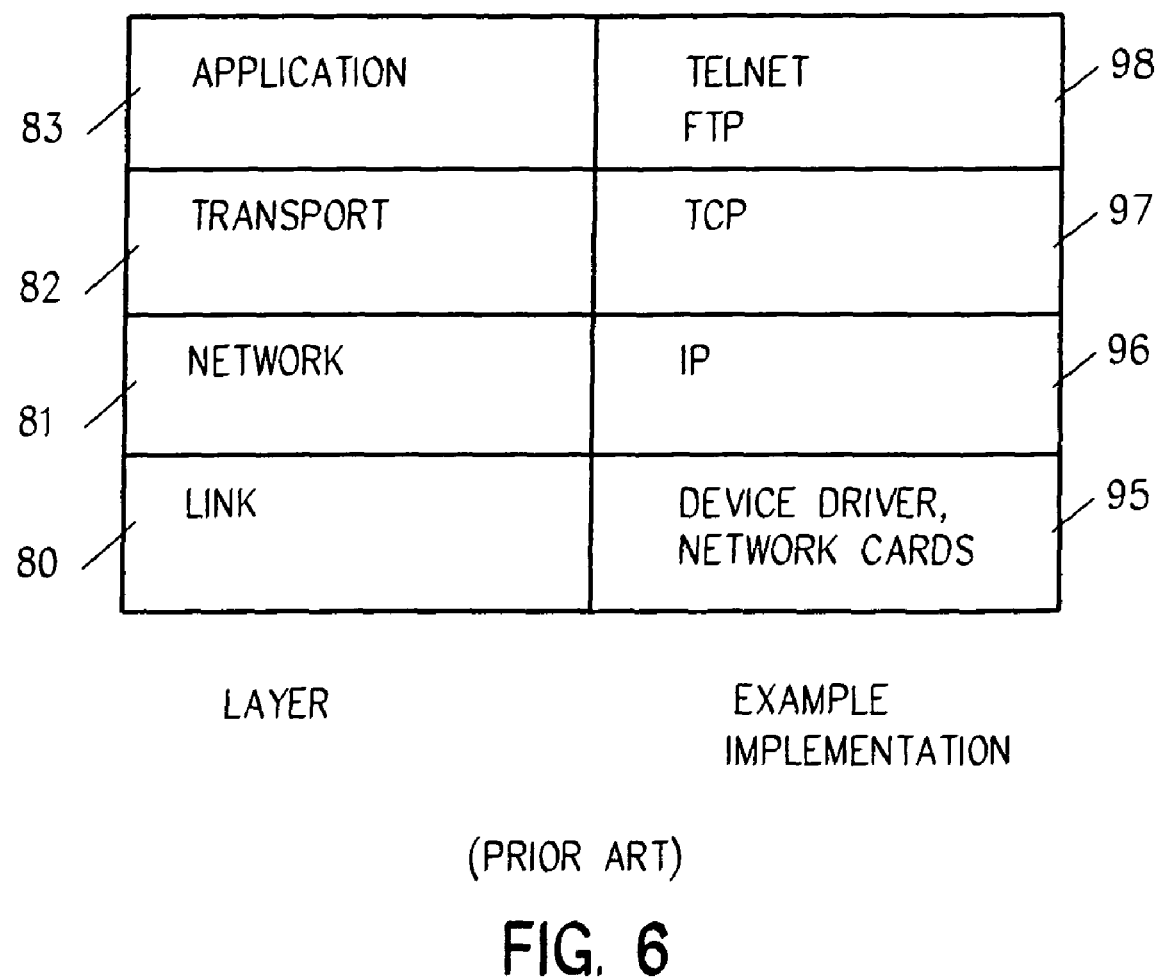
FIG. 6 illustrates the four layers of the TCP/IP protocol suite.

Referring to FIG. 6, the four layers 80-83 of the TCP/IP protocol suite include application layer 83, such as Telnet or FTP 98, transport layer 82, such as TCP 97, network layer 81, such as IP 96, and link layer 80, such as device driver or network cards 95. Through the technique of encapsulation, direct communication between protocol stacks occurs only between equivalent layers. For example, referring to FIG. 5, link layer 66 communicates with link layer 71, network layer 65 communicates with network layer 72, transport layer 64 communicates with transport layer 73, and application layer 67 communicates with application layer 74.

In accordance with a further embodiment of the invention, workstation 84, iSeries Telnet server 78 and iSeries Telnet client 77 connecting to UNIX server 85 together represent a cascaded connection, which is a sequence of connections from the users local workstation to the final remote server on which the application is running, requiring character dependent input/output in full duplex mode.

ADVANTAGES OVER THE PRIOR ART

It is an advantage of the invention that there is provided an improved system and method for rendering a common "look and feel" on different platforms and architectures.

It is a further advantage of the invention that there is provided an improved system and method for character interactive I/O in a half duplex block mode environment.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390 (z Series), AS/400 (i Series), PC (x Series), RISC/6000 (p Series), or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the exemplary embodiments of the invention have been described primarily with respect a preferred client server application of Telnet and thus to a TCP/IP environment, the invention is not limited to such. IPX and SNA network transports can also benefit for use of the invention.

Also, when reference is made to the Unix architecture, several flavors of Unix are contemplated, including AIX, Linux, Sun, and so forth. RISC and Sun Solaris computers are most often associated with Unix architecture, the iSeries computer is most often associated with 5250 architecture, and S/390 computers (such as those running the Virtual Machine (VM) operating system) most often associated with 3270 architecture. All these computer architectures can support the various network transports (TCP/IP, IPX, SNA, et.) and therefore this invention can apply to the many variations and permutations of each possible network configuration.

The invention is not even limited to networking environments since a Twinax display with standard 5250 architectural support of the auto-enter feature can be programmed to exploit this invention, affording the character interactive I/O.

Accordingly, the scope of protection of this invention is limited only by the following claims and their equivalents.

We claim:

1. A system for performing character interactive input/output in a half duplex block mode environment including a client workstation and a server including processor and memory, comprising:
    said client workstation including a client application selectively connected to a first server application written to half-duplex block mode architecture and to a second server application written to full duplex character interactive mode architecture;
    said client application for communicating over a half duplex block mode interface to said first server application in half-duplex block mode;
    said client application for communicating over said half duplex block mode interface with a second server application in full duplex character interactive input/output mode including:
    a display buffer for receiving a keystroke;
    said client application automatically transferring said keystroke from said client workstation over said half duplex block mode interface to said second server application;
    said second server application for processing said keystroke and responding appropriate to context of said server application;
    thereby transferring single keystrokes as they are entered at said client workstation even though operating in said half duplex block mode environment in which character sequences are normally transferred.

2. A system including processor and memory for character interactive input/output in a half duplex block mode environment, comprising:
    a first server application written to half-duplex block mode architecture;
    a client application for communicating over a half duplex block mode interface to said first server application in half-duplex block mode;
    a second server application written to full duplex character interactive mode architecture; said client application for communicating over said half duplex block mode interface with said second server application in full duplex character interactive mode including:
    a workstation display device configured as a one character field;
    a client emulator application responsive immediately upon entry of an input character into said one character field, for retrieving and communicating to said second server application over said half duplex block mode interface said input character from said one character field, and responsive to said second server application for displaying at said workstation display device an echo character selectively different from said input character;
    thereby transferring single input characters as they are entered at said one character field even though operating in said half duplex block mode environment in which character sequences are normally transferred.

3. A display for character interactive input/output in a half duplex block mode environment in which client applications at a client workstation selectively communicate with a first server application and with a second server application, said client workstation including processor and memory, comprising:
    a half duplex block mode interface over which said client applications selectively communicate with said first server application in half duplex block mode and with said second server application in full duplex character interactive mode;
    a one character, auto-entry, non-displayable buffer for receiving from an input device an input character for communication to a server application; and
    an output field for displaying an echo character from said server application;
    thereby transferring single keystrokes as they are entered at said input device even though operating in said half duplex block mode environment in which character sequences are normally transferred.

4. A non-transitory program storage device readable by a machine, tangibly embodying a program of instructions executable by a machine to perform method steps for operating a display in a half duplex block mode environment selectively in half duplex block mode and in full duplex character interactive input/output mode using an application layer half duplex block mode interface, when communicating in said full duplex character interactive input/output mode said method steps comprising the steps of:
    configuring said display with respect to a character entry device as a one character, auto-entry, non-displayable buffer;
    operating said application layer half duplex block mode interface selectively in half duplex block mode and in full duplex character interactive input/output mode by, responsive to entry of an input character into said one character, auto-entry, non-displayable buffer, immediately communicating over said application layer half duplex block mode interface said input character to a remote application for interpretation;
    thereby transferring single characters as they are entered at said character entry device even though operating in said half duplex block mode environment in which character sequences are normally transferred.

5. A computer program product for operating a display in a half duplex block mode environment selectively to communicate in half duplex block mode and full duplex character interactive mode according to method steps executed in full duplex character interactive mode, said computer program product comprising:
    a non-transitory computer readable storage medium;
    first program instructions for configuring said display with respect to a character entry device as a one character, auto-entry, non-displayable buffer;
    second program instructions for operating said display in a half duplex block mode environment selectively to communicate in half duplex block mode and full duplex character interactive mode by, responsive to entry of an input character into said one character, auto-entry, non-displayable buffer, immediately communicating said input character to a remote application via an application layer half duplex block mode interface for interpretation;

thereby transferring single characters as they are entered at said character entry device even though operating in said half duplex block mode environment in which character sequences are normally transferred; and wherein said first and second program instructions are recorded on said computer readable storage medium.

\* \* \* \* \*